United States Patent [19]

Steinert et al.

[11] Patent Number: 5,174,326
[45] Date of Patent: Dec. 29, 1992

[54] TEMPERATURE-COMPENSATED PRESSURE REGULATOR

[75] Inventors: Günter Steinert, Bad Oldesloe; Holger Stegmann, Lübeck, both of Fed. Rep. of Germany

[73] Assignee: Dragerwerk Aktiengesellschaft, Lübeck, Fed. Rep. of Germany

[21] Appl. No.: 831,894

[22] Filed: Feb. 6, 1992

[30] Foreign Application Priority Data

Feb. 8, 1991 [DE] Fed. Rep. of Germany ....... 4103769

[51] Int. Cl.⁵ ............................................ G05D 16/02
[52] U.S. Cl. .................................. 137/468; 137/505.14
[58] Field of Search ................... 137/505.14, 468, 906, 137/505.41

[56] References Cited

U.S. PATENT DOCUMENTS

| 767,200 | 8/1904 | Barnes | 137/468 X |
|---|---|---|---|
| 2,141,715 | 12/1938 | Hilger | 137/468 X |
| 2,163,597 | 6/1939 | Grove | 137/906 X |
| 2,261,364 | 11/1941 | Grove | 137/906 X |
| 2,884,946 | 5/1959 | Anderson | 137/505.14 X |
| 3,602,428 | 8/1971 | Lochner | 137/468 X |

FOREIGN PATENT DOCUMENTS

| 703791 | 12/1979 | U.S.S.R. | 137/468 |
| 2105007 | 3/1983 | United Kingdom | 137/468 |

Primary Examiner—Stephen M. Hepperle
Attorney, Agent, or Firm—McGlew and Tuttle

[57] ABSTRACT

A pressure regulator or pressure element with a valve, whose valve closing body 10 separates an admission pressure chamber 2 from a back pressure chamber 3, has a diaphragm 12 that is under spring pressure in the opening direction of the valve closing body 10. The diaphragm 12 separates the back pressure chamber from a reference pressure chamber 4 which is filled with a gas that is under such pressure that its ability to expand compensates the temperature dependence of the compressive force of the spring in order to compensate the pressing force of the compression spring 13, which changes with changing temperature.

7 Claims, 2 Drawing Sheets

TEMPERATURE-COMPENSATED PRESSURE REGULATOR

FIELD OF THE INVENTION

The present invention pertains to a pressure regulator with a value, whose valve closing body separates an admission pressure chamber from a back pressure chamber, wherein the admission pressure chamber is provided with an inlet and the back pressure chamber is provided with an outlet for a flowing fluid, as well as with a reference pressure chamber, which is separated in a gastight manner from the back pressure chamber via a diaphragm which is in functional connection with the valve closing body toward the back pressure chamber and is under the pressure load of an elastic element received in the reference pressure chamber.

BACKGROUND OF THE INVENTION

Such a valve has become known from West German Patent No. DE-PS 932,764.

In this prior-art pressure regulator, a bellows-shaped reference pressure chamber is filled under a defined pressure that adds, together with a compression spring, to an overall opening pressure for the closing element. This reference chamber is located above the valve closing body. The reference pressure chamber communicates with the ambient atmosphere, so that pressure variations in the ambient atmosphere have such an effect that the pressure exerted on the closing element increases as the atmospheric pressure increases and decreases as the atmospheric pressure decreases. Thus, the valve operates in such a way that the ambient pressure is taken into account. In various possible applications, especially aeronautics and space travel, the gas-carrying lines and especially the pressure-regulating and control devices are subject to great temperature variations. Since the modulus of elasticity of the elastic element also changes with changing ambient temperature, accurate pressure regulation, which requires constancy of the spring force, is only possible at increased expense. It may be assumed that the modulus of elasticity is known to change by ca. 0.0489% per °C. based on a compression spring made of spring steel (X12 chromenickel 177) as an elastic element. This means that a standard deviation of ca. 3.4% can be expected in the case of a typical temperature change of 70° C. If this deviation is to be avoided, it would be possible to use a special spring steel with a modulus of elasticity that remains constant in broad temperature ranges, but this would lead to an expensive embodiment. It was also suggested that a piston, which is connected to a reservoir for a liquid, e.g., silicone, be allowed to act on the spring in order to achieve temperature compensation of the spring force of a pressure regulator. When the spring force decreases as a consequence of increased temperature, the liquid expands and displaces the piston and consequently also the spring in such a direction that the controlling force of the spring will increase correspondingly. When the ambient temperature again decreases, the liquid reservoir shrinks, and the increasing spring force provides for a constant pressure effect (EP-A-113,470). This prior-art device has the disadvantage that an expensive design is needed in order to be able to allow the piston-cylinder arrangement to act only on the spring; in addition, expensive sealing measures are required to separate the gas chamber from the liquid reservoir. The need to constantly keep ready a substantial amount of liquid makes the prior-art pressure regulator unsuitable for use in the area of aeronautics and space travel because of the large weight. In addition, only liquids that do not freeze in the temperature range to be taken into account would be able to be selected.

SUMMARY AND OBJECTS OF THE INVENTION

Accordingly, it is a primary object of the present invention to improve a pressure regulator of the above-mentioned type such that the compensation of the pressure load of the elastic element, which changes with changing temperature, can be accomplished with simple means, and the overall volume and weight of the device can be kept as low as possible.

The task is accomplished by the reference pressure chamber being filled with a gas whose gas pressure is selected to be such that its temperature-dependent expansion exerts a compensating force on the diaphragm, which compensating force counteracts the pressure load of the elastic element that changes with changing temperature.

The present invention achieves the advantage that the gas pressure in the reference pressure chamber needs to be set only to the extent that its temperature-dependent expansion characteristic, which corresponds to the linear characteristic of an ideal gas (Gay-Lussac law) in this case, is adjusted to the linear characteristic of the elastic element. The characteristic shows an opposite trend, so that simple compensation of the pressure load with changing temperature can thus be realized by the elastic element, without any need to make any comprehensive changes in the physical embodiments of the pressure regulator. Temperature-dependent deviations are reduced with the pressure regulator according to the present invention so much that they no longer significantly affect the control accuracy. The compensated deviation is reduced to about ¼ of the non-compensated deviation.

Not only is the temperature dependence of the spring characteristic of the elastic element compensated according to the present invention, but other temperature-dependent changes, e.g., the longitudinal expansion of the housing in the direction of the elastic force, are compensated as well.

It is advantageous to seal off the reference pressure chamber against the ambient atmosphere, so that it itself can be placed with the gas to be taken into account under such a pressure that the temperature dependence of the elastic force will be compensated.

To achieve pressure regulation that is dependent of the ambient pressure, the reference pressure chamber is open toward the ambient atmosphere, and an auxiliary chamber, whose gas filling is placed under the pressure exerting the compensating force, is provided in it. The auxiliary chamber acts, on the one hand, as a barometric cell which expands or contracts more or less under changing ambient pressure, and the gas contained in it compensates, due to its ability to expand, the spring force that changes with the temperature. The auxiliary chamber is attached, on the one hand, to the surface of the diaphragm facing the reference pressure chamber, in a gastight manner and is connected, on the other hand, to the housing inner wall of the reference pressure chamber.

Either the reference pressure chamber or the auxiliary chamber is advantageously filled by providing a filling opening through which the gas is filled under a predetermined pressure, after which this filling connection is closed with conventional means in a gastight and pressuretight manner.

The gas filling and its pressure in the reference pressure chamber or in the auxiliary chamber are to be adapted to the material and the spring characteristic, taking into account the geometric conditions, such as the surface area of the diaphragm, the spring rate, the pressing area of the elastic element and the back pressure to be regulated.

The same temperature-dependent pressure compensation can also be achieved in a barometrically controlled maximum pressure switch. Instead of regulating the pressure of a flowing medium, a switching sensor is actuated in this case by means of a barometric cell (bellows) via a switching diaphragm. The filling pressure of the barometric cell acting as an auxiliary diaphragm in the housing of the pressure switch is designed to be such that the temperature-dependent change (reduction) of the spring force is compensated by the counteracting expansion of the gas. A maximum pressure switch is thus obtained, the actuation of whose switching sensor depends only on the ambient pressure and only insignificantly on the ambient temperature.

This makes it possible to set a switching point more reproducibly and within narrower tolerance limits.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
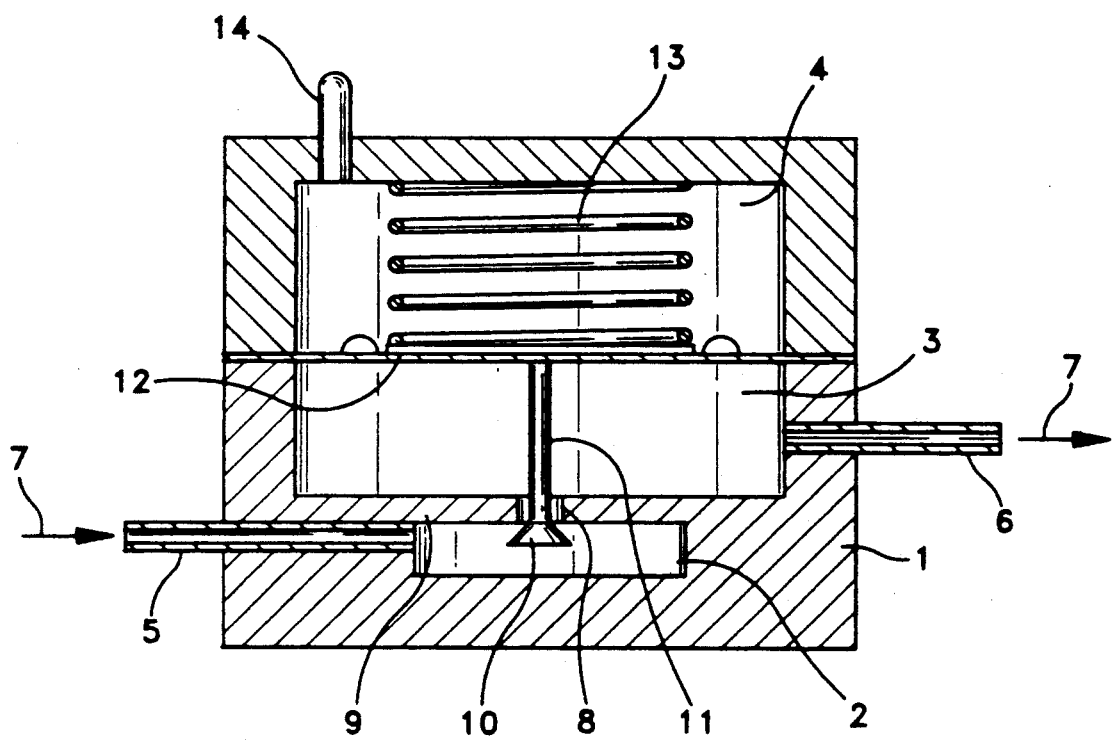
FIG. 1 is a sectional view taken through a pressure regulator with closed reference pressure chamber according to the invention.

FIG. 1 shows the housing 1 of a pressure regulator which contains an admission pressure chamber 2, a back pressure chamber 3, as well as a reference pressure chamber 4. An inlet 5 opens into the admission pressure chamber 2, and an outlet 6 leads from the back pressure chamber 3 to a user (not shown). The inlet 5 is supplied from a pressurized gas source (not shown). The direction of flow of the fluid, e.g., hydrogen or oxygen-enriched respiratory gas, is indicated by the direction arrows 7. The admission pressure chamber 2 and the back pressure chamber 3 are in flow connection with one another via an opening 8 in the housing wall 9, and the opening acts as a valve seat 8 for a valve closing body 10 which is connected via a pin 11 to the face of a diaphragm 12 facing the back pressure chamber 3. The diaphragm 12 is clamped gastightly in the housing 1 and acts as a partition for the reference pressure chamber 4 located behind it. A compression spring 13, which is supported by the face of the diaphragm 12, on the one hand, and by the inner side of the reference chamber 4 facing the diaphragm 12, on the other hand, is contained in the reference pressure chamber 4. The force of pressure of the compression spring 13 holds the valve closing body 10 in the open position against the back pressure occurring in the back pressure chamber 3, so that the flow connection between the inlet 5 and the outlet 6 is maintained. The reference pressure chamber 4 is filled with a gas (e.g., nitrogen) of a defined pressure via a filling pipe 14 which is closed off against the ambient atmosphere in a gastight and pressuretight manner in the state shown, i.e., after completion of filling.

Figure 2:
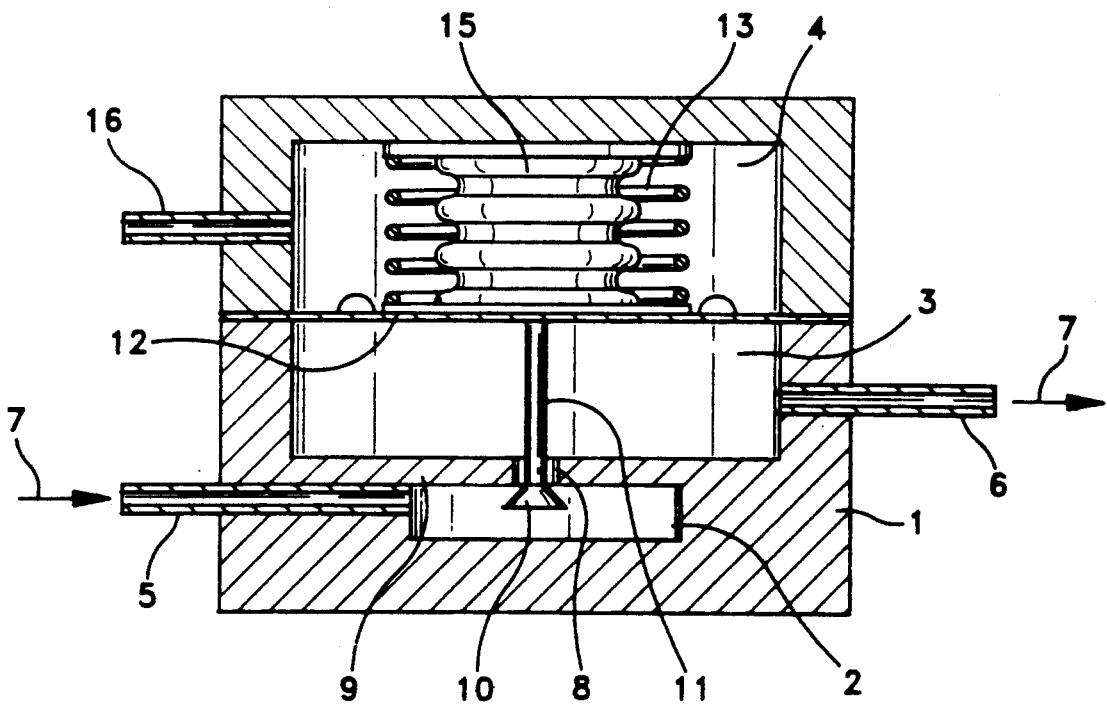
FIG. 2 is a sectional view taken through a pressure regulator with open reference pressure chamber and auxiliary chamber according to the invention.

The essential parts of the pressure regulator shown in FIG. 2 have the same design as those in FIG. 1, so that identical components also have identical reference numerals. The reference pressure chamber 4 contains, in addition to the compression spring 13, a bellows-shaped auxiliary chamber 15 which, enveloped by the compression spring 13, is also attached gastightly between the surface of the diaphragm 12 facing the reference pressure chamber 4 and the side of the reference pressure chamber 4 facing the diaphragm. The auxiliary chamber 15 is designed such that it is exposed to the ambient pressure, on the one hand, and, on the other hand, it encloses the gas filling that is under a defined gas pressure in a gastight manner in its interior space and is also able to follow the stroke movements of the diaphragm 12. The reference pressure chamber 4 is connected to the ambient atmosphere via a vent line 16. The auxiliary chamber 15 can be filled by means of a filling pipe in a manner similar to that explained on the basis of FIG. 1, but it is also possible to perform mounting of the auxiliary chamber 15 under a gas atmosphere of a defined pressure, so that the gas volume once trapped in the auxiliary chamber 15 will also be available during the operation of the pressure regulator under the necessary gas pressure.

Figure 3:
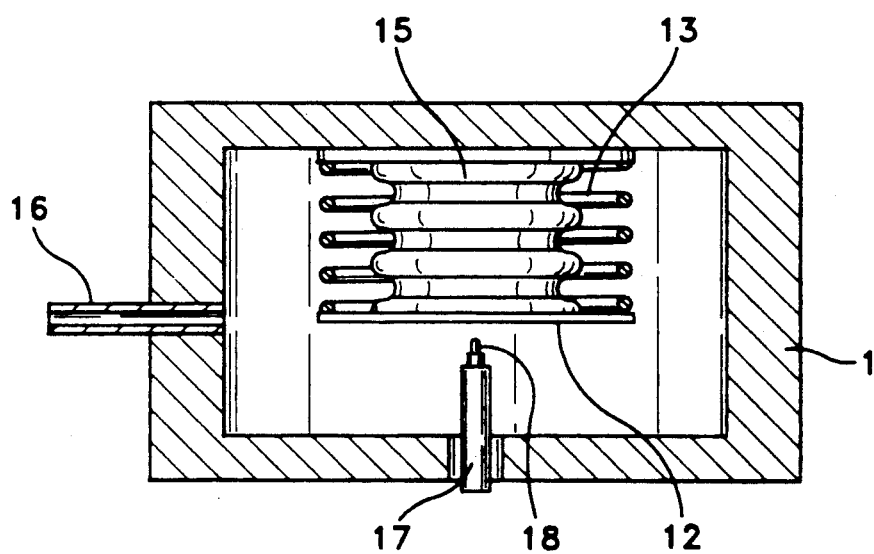
FIG. 3 is a sectional view taken through a pressure switch with open housing and auxiliary chamber according to the invention.

FIG. 3 shows a pressure switch whose housing 1 is open toward the ambient atmosphere via the vent line 16. A cylindrical compression spring 13 is supported between the diaphragm 12 and an interior wall of the housing 1. The switching surface of the diaphragm 12 is maintained at a distance from a switching pin 18 of a switching sensor 17. Surrounded by the cylindrical spring 13, an auxiliary chamber 15 in the form of an elastic bellows, which is filled with a gas of a predetermined pressure, is located between the diaphragm 12 and the interior wall of the housing 1. A switching line, not shown, leads from the switching sensor 17 to a component to be switched, also not shown. The switch shown can be considered to be a barometrically controlled maximum pressure switch, in which the change in the spring characteristic, which depends on the ambient temperature, is compensated by the ability to expand of the gas volume enclosed in the bellows in a pressuretight and gastight manner.

What is claimed is:

1. A pressure regulator, comprising: means defining an admission pressure chamber; means defining a back pressure chamber; a valve closing body separating communication between said back pressure chamber and said admission pressure chamber; an inlet connected to said admission pressure chamber; an outlet connected to said back pressure chamber, said inlet, said outlet and said admission pressure chamber and said back pressure chamber providing a path for a flowing fluid; a reference pressure chamber gas tightly separated from said back pressure chamber via a diaphragm, said diaphragm being functionally connected with said valve closing body in the direction of said back pressure chamber; an elastic element positioned in said reference pressure chamber providing an elastic element pressure load exerted on said diaphragm urging said diaphragm toward said back pressure chamber, said pressure load of said elastic element changing with a changing temperature; a gas, at least partially filling said pressure chamber, said gas being selected to have a gas pressure providing a temperature-dependent expansion exerted on said diaphragm providing a compensating force counteracting changes in said elastic element pressure load with changing temperature.

2. A pressure regulator according to claim 1, wherein said reference pressure chamber is sealed off against ambient atmosphere and said gas fills said reference pressure chamber.

3. A pressure regulator according to claim 1, wherein said reference pressure chamber is open to ambient atmosphere and an auxiliary chamber is positioned within said reference pressure chamber filled with said gas, said auxiliary chamber being positioned such that said gas exerts pressure on said diaphragm.

4. A pressure regulator according to claim 3, wherein said elastic element is a cylindrical compression spring formed of spring steel, said auxiliary chamber being formed by a bellow structure that is surrounded by said spring and follows stroke movements of said spring.

5. A pressure switch, comprising: a housing having a vent line opening to the exterior of said housing; an elastic element in the form of a cylindrical compression spring supported between a switching diaphragm and an interior wall of said housing, opposite said switching diaphragm, said elastic element subjecting said diaphragm to a pressure load, said pressure load of said elastic element changing with changing temperature; an auxiliary chamber filled with gas under pressure, gas pressure being temperature-dependent, said auxiliary chamber being formed by a bellows structure that is surrounded by the spring and follows stroke movements of the spring, said auxiliary chamber being positioned such that said gas exerts a compensating force on said diaphragm wherein said gas is selected such that said compensating force changes with changing temperature for compensating changes due to temperature of said pressure load of said elastic element.

6. A pressure regulator according to claim 5, wherein said cylindrical compression spring is formed of spring steel.

7. A pressure regulator, comprising: means defining an admission pressure chamber; means defining a back pressure chamber; a valve closing body separating communication between said back pressure chamber and said admission pressure chamber; an inlet connected to said admission pressure chamber; an outlet connected to said back pressure chamber, said inlet, said outlet and said admission pressure chamber and said back pressure chamber providing a path for a flowing fluid; a reference pressure chamber gas tightly separated from said back pressure chamber via a diaphragm, said diaphragm being functionally connected with said valve closing body in the direction of said back pressure chamber; an elastic element positioned in said reference pressure chamber providing an elastic element pressure load exerted on said diaphragm urging said diaphragm toward said back pressure chamber, said pressure load of said elastic element changing with a changing temperature; an auxiliary chamber formed by a bellows structure surrounded by said elastic element a gas, at least partially filling said auxiliary chamber, said gas being selected to have a gas auxiliary providing a temperature-dependent expansion exerted on said diaphragm providing a compensating force counteracting changes in said elastic element pressure load with changing temperature.

* * * * *